(12) United States Patent
Masiewicz

(10) Patent No.: US 7,280,302 B1
(45) Date of Patent: Oct. 9, 2007

(54) DISK DRIVE USING LOOPBACK TO CALIBRATE TRANSMISSION AMPLITUDE

(75) Inventor: John C. Masiewicz, Mission Viejo, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 11/280,046

(22) Filed: Nov. 16, 2005

(51) Int. Cl.
*G11B 15/18* (2006.01)
*G01R 31/28* (2006.01)
*G01D 18/00* (2006.01)

(52) U.S. Cl. .......................... 360/69; 714/716; 702/85
(58) Field of Classification Search ...................... None
See application file for complete search history.

(56) References Cited

U.S. PATENT DOCUMENTS

| | | | |
|---|---|---|---|
| 5,128,962 A | | 7/1992 | Kerslake et al. |
| 6,052,655 A | * | 4/2000 | Kobayashi et al. ......... 702/184 |
| 6,069,494 A | | 5/2000 | Ishikawa |
| 7,027,245 B2 | * | 4/2006 | Mitchell et al. .............. 360/46 |

2005/0024083 A1   2/2005  Kitamura et al.

OTHER PUBLICATIONS

U.S. Appl. No. 11/092,119, Masiewicz et al.
"Serial ATA: High Speed Serialized AT Attachment", http://www.serialata.org, Jan. 7, 2003, Revision 1.0a, pp. 106-111.

* cited by examiner

*Primary Examiner*—Hoa Thi Nguyen
*Assistant Examiner*—Mitchell Slavitt
(74) *Attorney, Agent, or Firm*—Jason T. Evans, Esq.; Howard H. Sheerin, Esq.

(57) ABSTRACT

A disk drive is disclosed for connecting to a host, the host comprising loopback circuitry operable to loop a pattern received from the disk drive back to the disk drive. The disk drive comprises interface circuitry including a transmitter driver operable to transmit transmission signals at a transmission amplitude, and a receiver driver operable to receive reception signals. The transmitter driver is configured to transmit at an initial transmission amplitude, and a calibration pattern is transmitted to the host through the transmitter driver. The reception signals received by the receiver driver are monitored to detect a loopback pattern representing a loopback of the calibration pattern. The loopback pattern is processed to detect an error, and the transmission amplitude is adjusted in response to the error.

27 Claims, 8 Drawing Sheets

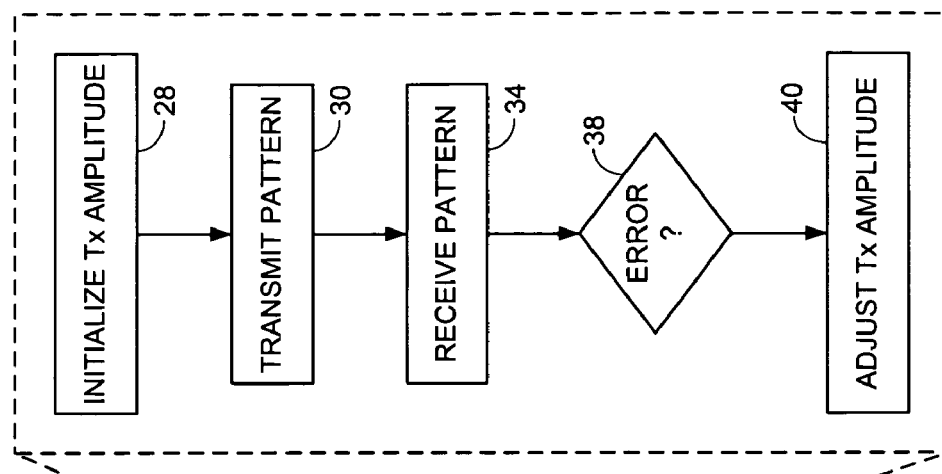
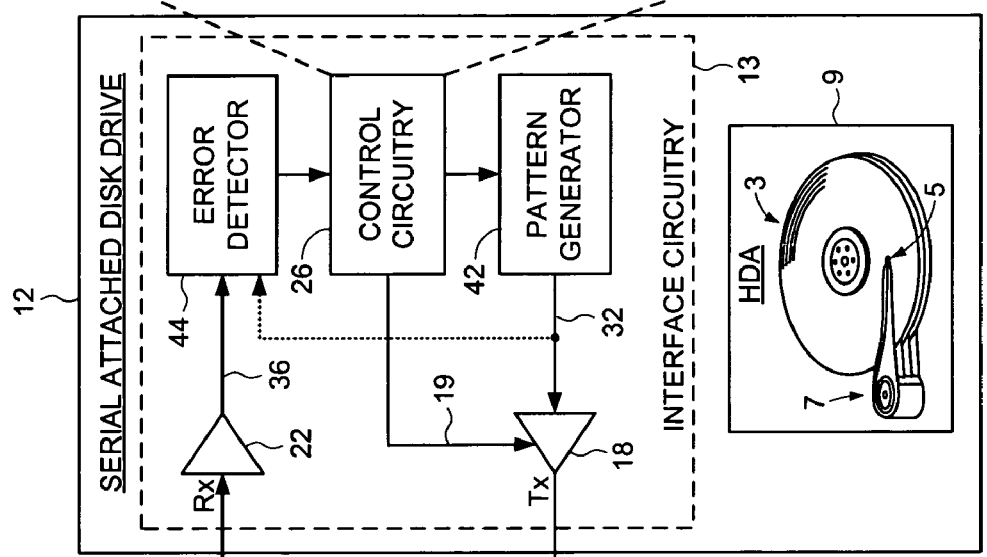
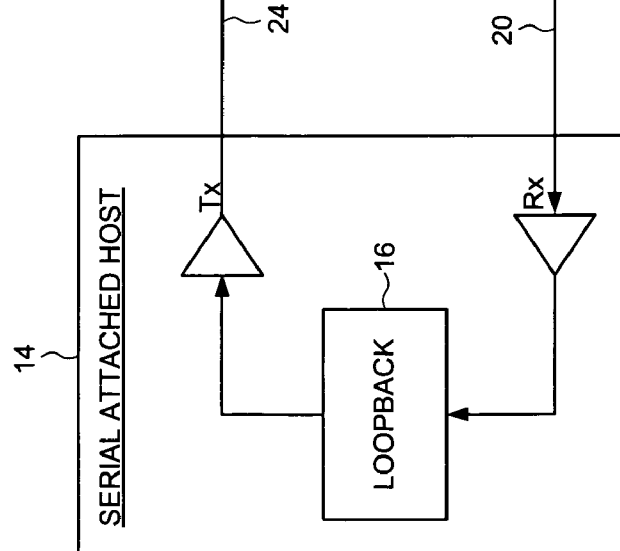

DISK DRIVE USING LOOPBACK TO CALIBRATE TRANSMISSION AMPLITUDE

BACKGROUND OF THE INVENTION

1. Field of the Invention

The present invention relates to disk drives used in computer systems. More particularly, the present invention relates to a disk drive using loopback to calibrate transmission amplitude.

2. Description of the Prior Art

FIG. 1 shows a typical configuration of a serial attached host 2 connected to a serial attached disk drive 4, such as a serial advanced technology attachment (SATA) disk drive. The serial attached disk drive 4 comprises one or more disks 3 with one or more heads 5 for accessing respective disk surfaces. The heads 5 are connected to the distal end of actuator arms which are rotated about a pivot by a voice coil motor (VCM) 7 in order to actuate the heads 5 radially over the disk surfaces. The disks 3, heads 5, and VCM 7 are enclosed in a head disk assembly (HDA) 9 and controlled by control circuitry mounted on a printed circuit board coupled to the HDA 9. The control circuitry includes interface circuitry 11 for interfacing with the serial attached host 2 over a serial connection.

The interface circuitry 11 in both the serial attached host 2 and serial attached disk drive 4 of FIG. 1 implements an application layer 6, a link/transport layer 8, and a physical layer 10. The application layer 6 includes application and driver software that create specific tasks for the transport layer 8 to process. The transport layer 8 encapsulates commands, data, status, etc., from the application layer 6 into frames to be transmitted, and receives frames, disassembles the frames, and sends the frames' content to the application layer 6. The transport layer 8 sends messages to the link layer in order to establish connections. The link layer 8 controls the physical layer 10 for connection management. The physical layer 10 contains the hardware (such as transceivers and the encoding machines) that connects to the physical interface and sends the signals out on the wire.

The specification for the electrical interface, including the signaling amplitude, may vary depending on the types of serial attached disk drive. For example, the SATA interface specifies a transmission voltage in the range of 400–600 mV and a reception voltage in the range of 325–600 mV, whereas the serial attached SCSI (SAS) interface specifies a transmission voltage in the range of 800–1600 mV and a reception voltage in the range of 275–1600 mV. To be considered compliant, a serial attached disk drive should operate within the limits of its particular interface specification.

In some cases, it may be desirable for a serial attached disk drive to operate with a number of different interface standards. For example, it may be desirable for a SATA disk drive to be capable of connecting to either a SATA host or a SAS host. However, the signaling amplitude of the drive's SATA interface may be insufficient to communicate reliably with a SAS host, particularly if the communication channel attenuates the signaling. For example, the length of the serial communication cable contributes to signal attenuation, particularly for external disk drives connected to a host through a long cable. Channel attenuation may also decrease reliability for compatible devices, for example, if a SATA disk drive is connected to a SATA host through a long cable. In addition, the signaling amplitude selected by a SATA disk drive impacts power consumption, which is of particular concern in portable applications.

There is, therefore, a need to optimize the signaling amplitude in a disk drive so that, for example, the disk drive may operate with a number of different interface standards while remaining compliant, compensate for channel attenuation, and/or reduce power consumption in portable applications.

SUMMARY OF THE INVENTION

An embodiment of the present invention comprises a disk drive for connecting to a host, the host comprising loopback circuitry operable to loop a pattern received from the disk drive back to the disk drive. The disk drive comprises a disk, a head actuated over the disk, and interface circuitry for interfacing with the host. The interface circuitry comprises a transmitter driver operable to transmit transmission signals at a transmission amplitude, and a receiver driver operable to receive reception signals. The disk drive further comprises control circuitry operable to calibrate the transmission amplitude. The transmitter driver is configured to transmit at an initial transmission amplitude, and a calibration pattern is transmitted to the host through the transmitter driver. The reception signals received by the receiver driver are monitored to detect a loopback pattern representing a loopback of the calibration pattern. The loopback pattern is processed to detect an error, and the transmission amplitude is adjusted in response to the error.

In one embodiment, the interface circuitry comprises a serial communication interface, such as a serial advanced technology attachment (SATA) interface.

In another embodiment, the disk drive is operable to receive an out-of-band signal from the host, and the control circuitry is operable to calibrate the transmission amplitude in response to the disk drive receiving the out-of-band signal from the host. In one embodiment, the out-of-band signal comprises a COMWAKE signal.

In still another embodiment, the control circuitry is operable to adjust the transmission amplitude by increasing the transmission amplitude, and in an alternative embodiment, the control circuitry is operable to adjust the transmission amplitude by decreasing the transmission amplitude. In another embodiment, the control circuitry is operable to adjust the transmission amplitude until the error reaches a predetermined threshold. In yet another embodiment, the control circuitry is further operable to set the transmission amplitude to a plurality of different values, detect a plurality of corresponding error values, and select an operating transmission amplitude in response to the plurality of error values.

In yet another embodiment, the control circuitry is further operable to transmit a request to the host to enable the loopback circuitry. In one embodiment, the control circuitry is further operable to transmit a built-in self test frame information structure (FIS) to the host to enable the loopback circuitry.

In one embodiment, the control circuitry is operable to detect the error by comparing the loopback pattern to the calibration pattern. In an alternative embodiment, the control circuitry is operable to detect the error by encoding the calibration pattern and detecting invalid data in the loopback pattern.

Another embodiment of the present invention comprises a method of calibrating a transmission amplitude of transmission signals generated by a disk drive connected to a host, the host comprising loopback circuitry operable to loop a pattern received from the disk drive back to the disk drive. The method comprises the steps of transmitting a calibration pattern to the host at an initial transmission amplitude, detecting a loopback pattern representing a loopback of the calibration pattern, processing the loopback pattern to detect an error, and adjusting the transmission amplitude in response to the error.

BRIEF DESCRIPTION OF THE DRAWINGS

FIGS. 2A and 2B show an embodiment of the present invention wherein control circuitry within the serial attached disk drive transmits a calibration pattern to the host, and detects errors in the loopback pattern received from the host in order to adjust the transmission amplitude.

DESCRIPTION OF THE PREFERRED EMBODIMENTS

Figure 1:
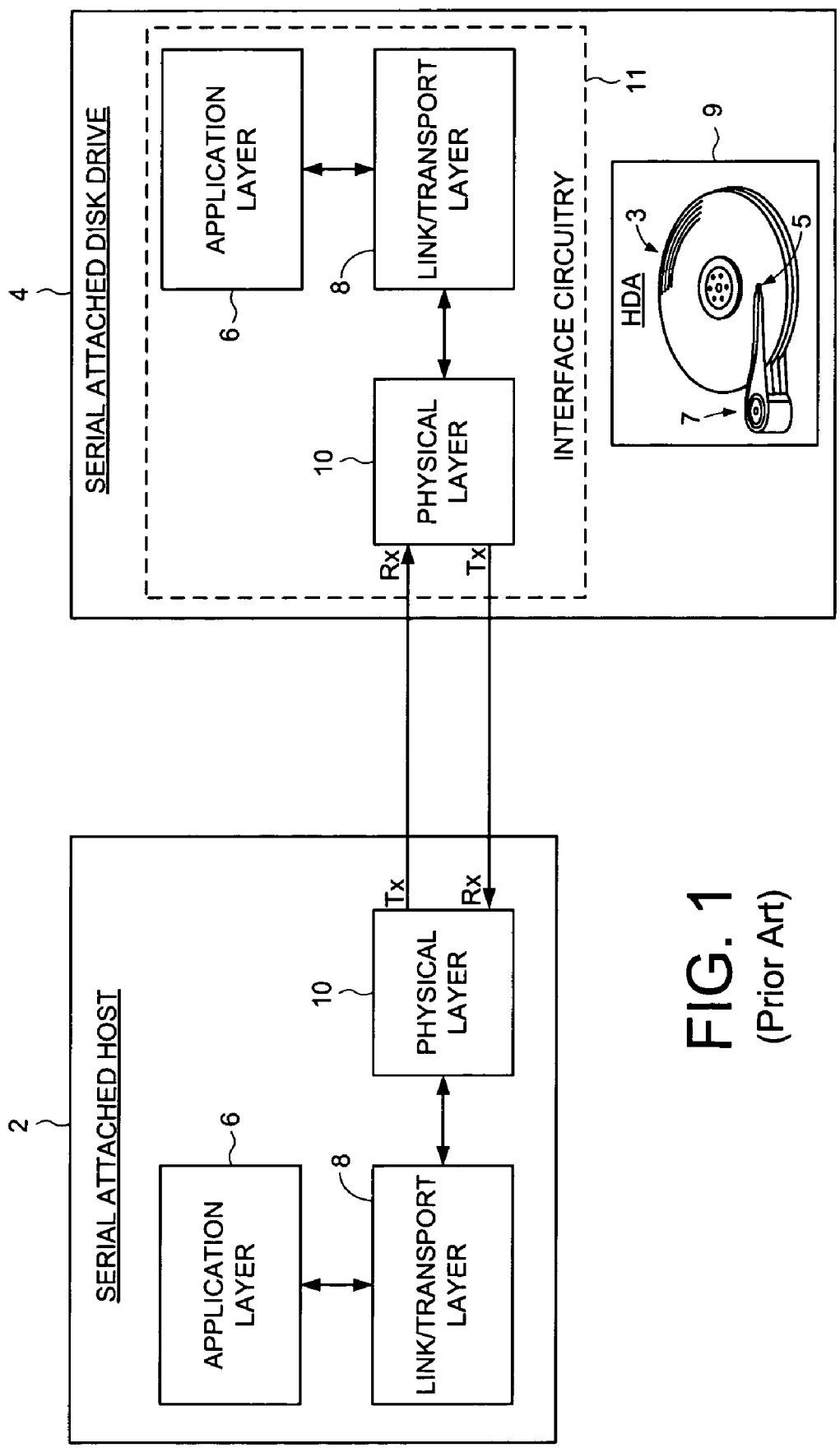
FIG. 1 shows a prior art configuration wherein a serial attached host is connected to a serial attached disk drive through a serial cable, wherein signals are transmitted/received through a physical layer.

FIG. 2A shows an embodiment of the present invention comprising a disk drive 12 for connecting to a host 14, the host 14 comprising loopback circuitry 16 operable to loop a pattern received from the disk drive 12 back to the disk drive 12. The disk drive 12 comprises a disk 3, a head 5 actuated over the disk 3, and interface circuitry 13 for interfacing with the host 14. The interface circuitry 13 comprises a transmitter driver 18 operable to transmit transmission signals 20 at a transmission amplitude, and a receiver driver 22 operable to receive reception signals 24. The disk drive 12 further comprises control circuitry 26 operable to calibrate the transmission amplitude. The control circuitry 26 executes the flow diagram of FIG. 2B wherein at step 28 the transmitter driver 18 is configured (over line 19) to transmit at an initial transmission amplitude, and at step 30 a calibration pattern 32 is transmitted to the host 14 through the transmitter driver 18. At step 34 the reception signals 24 received by the receiver driver 22 are monitored to detect a loopback pattern 36 representing a loopback of the calibration pattern. At step 38 the loopback pattern is processed to detect an error, and at step 40 the transmission amplitude is adjusted in response to the error. In the embodiment of FIG. 2A, the disk drive 12 is a serial attached disk drive, such as a serial advanced technology attachment (SATA) disk drive, connected to a serial attached host 14.

Any suitable control circuitry 26 may be employed in the embodiments of the present invention. In one embodiment, the control circuitry 26 comprises a microprocessor executing instructions, the instructions being operable to cause the microprocessor to perform the steps of FIG. 2B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 3 and read into a volatile semiconductor memory. In yet another embodiment, the control circuitry 26 comprises suitable logic circuitry, such as state machine circuitry.

The calibration pattern 32 may also be generated using any suitable circuitry, and may be considered an integral part of the control circuitry 26. In the embodiment of FIG. 2A, a pattern generator 42 generates the calibration pattern 32 in any suitable manner, such as by using a sequence generator implemented with a suitable polynomial (e.g., a pseudo random number generator), or by reading the calibration pattern from a non-volatile memory. The calibration pattern 32 may comprise any suitable sequence, and in one embodiment, comprises a number of different sequences in order to calibrate the transmission amplitude over a desired bandwidth of the communication channel.

Figure 8A:
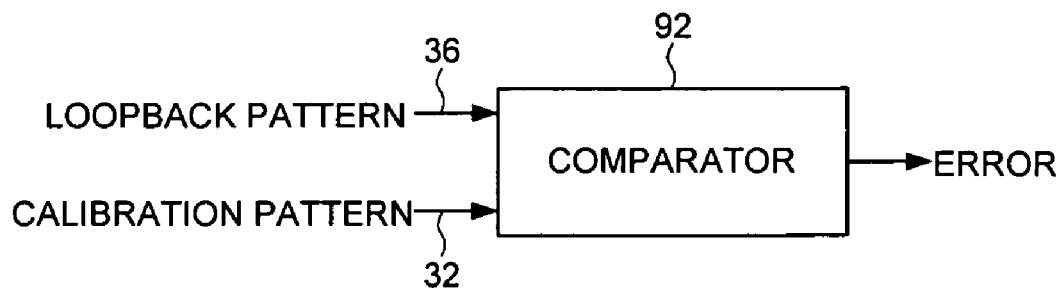
FIG. 8A shows an embodiment of the present invention wherein the error is detected by comparing the loopback pattern to the calibration pattern.
Figure 8B:
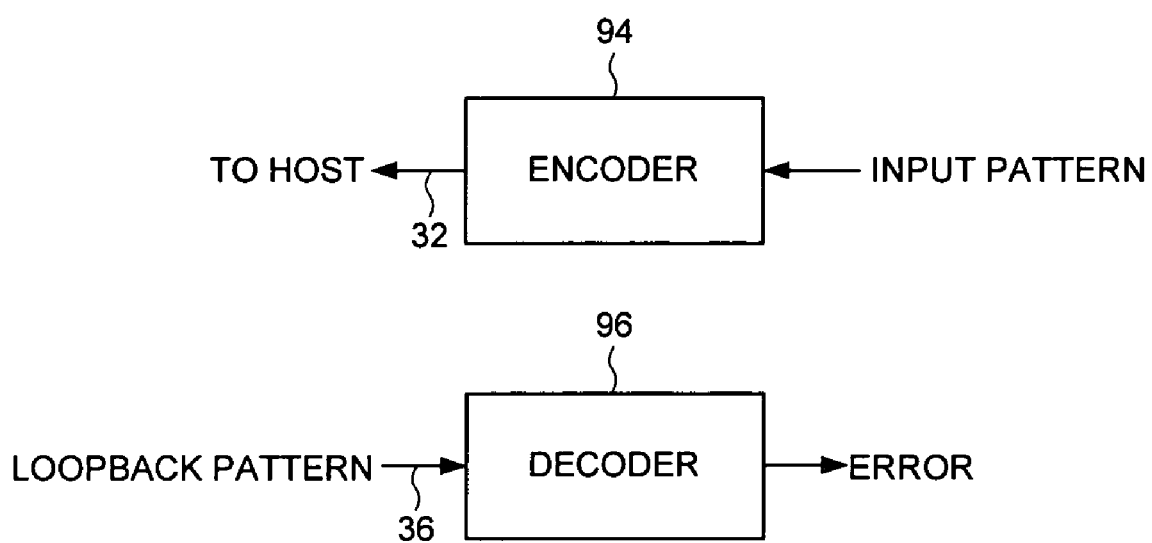
FIG. 8B shows an embodiment of the present invention wherein the error is detected by encoding the calibration pattern and detecting invalid data in the loopback pattern.

The circuitry for detecting the error in the loopback pattern 36 may comprise any suitable circuitry, and may also be considered an integral part of the control circuitry 26. In the embodiment of FIG. 2A, an error detector 44 detects the error in the loopback pattern 36 and the control circuitry 26 responds to the error by adjusting the transmission amplitude of the transmitter driver 18. As described below with reference to FIGS. 8A and 8B, the error detector 44 may detect the error in the loopback pattern 36 in any suitable manner, such as by comparing the calibration pattern 32 to the loopback pattern 36, or by detecting invalid data when decoding the loopback pattern 36.

Figure 3:
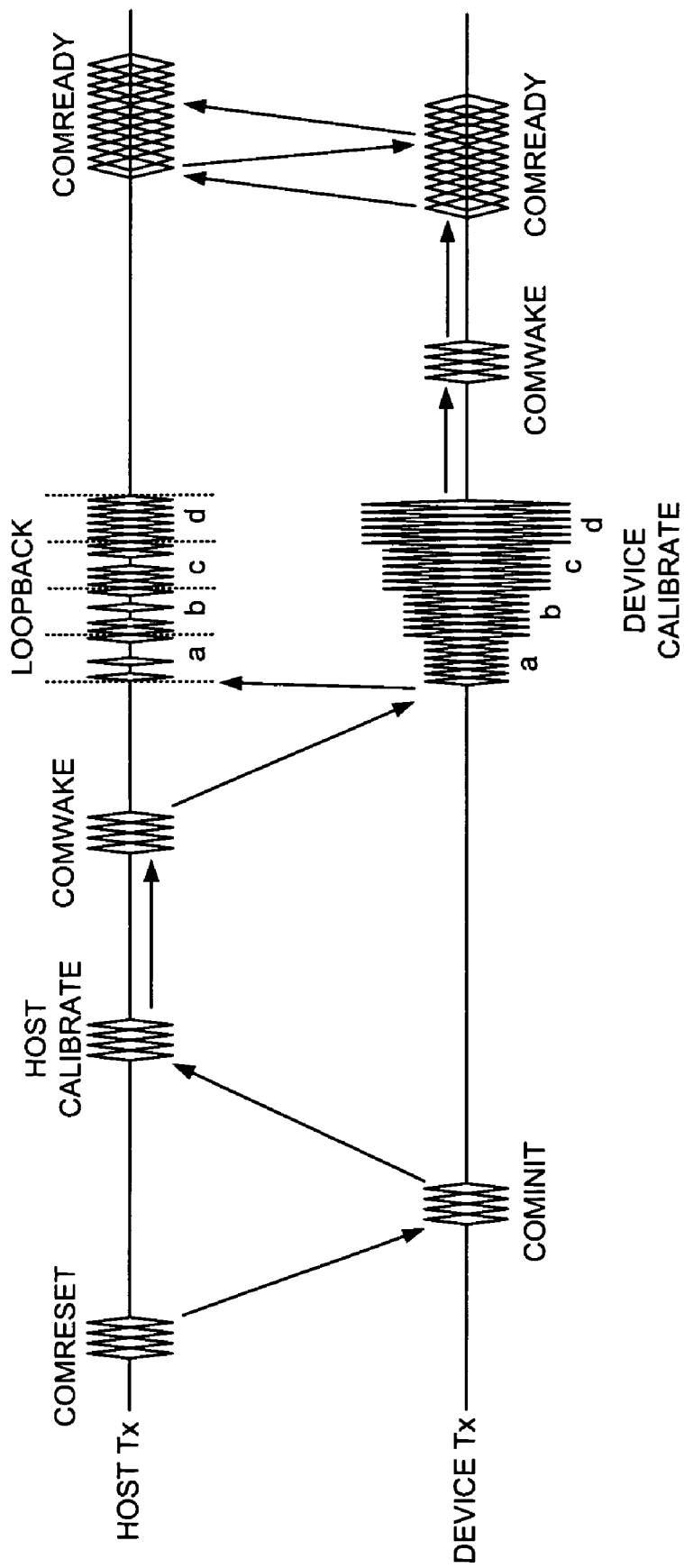
FIG. 3 shows an embodiment of the present invention wherein the transmission amplitude is calibrated during the calibration interval of the SATA communication reset procedure.

The transmission amplitude may be calibrated at any suitable time during communication between the disk drive 12 and the host 14. In one embodiment, the transmission amplitude is calibrated during a calibration interval of a communication reset procedure. In the embodiment wherein the disk drive 12 is a SATA disk drive, the calibration interval occurs in response to the SATA disk drive receiving an out-of-band signal from the host. This embodiment is illustrated in FIG. 3, which shows the signaling sequence of the SATA interface during a reset procedure (e.g., during a power-on sequence). The host transmits a COMRESET signal to the disk drive, and the disk drive responds with a COMINIT signal. In response to the COMINIT signal, the host performs any suitable calibration procedures during a host calibration interval, and then sends a COMWAKE signal to the disk drive. In response to the COMWAKE signal, the disk drive calibrates the transmission amplitude by executing the flow diagram of FIG. 2B. In the embodiment of FIG. 3, the disk drive transmits the calibration pattern at four progressively larger transmission amplitudes (a, b, c, d) wherein the corresponding loopback pattern is error free when transmitting at amplitude d. The disk drive saves transmission amplitude d as the operating transmission amplitude, and transmits a COMWAKE signal to the host which begins the normal communication process denoted as COMREADY.

Figure 4:
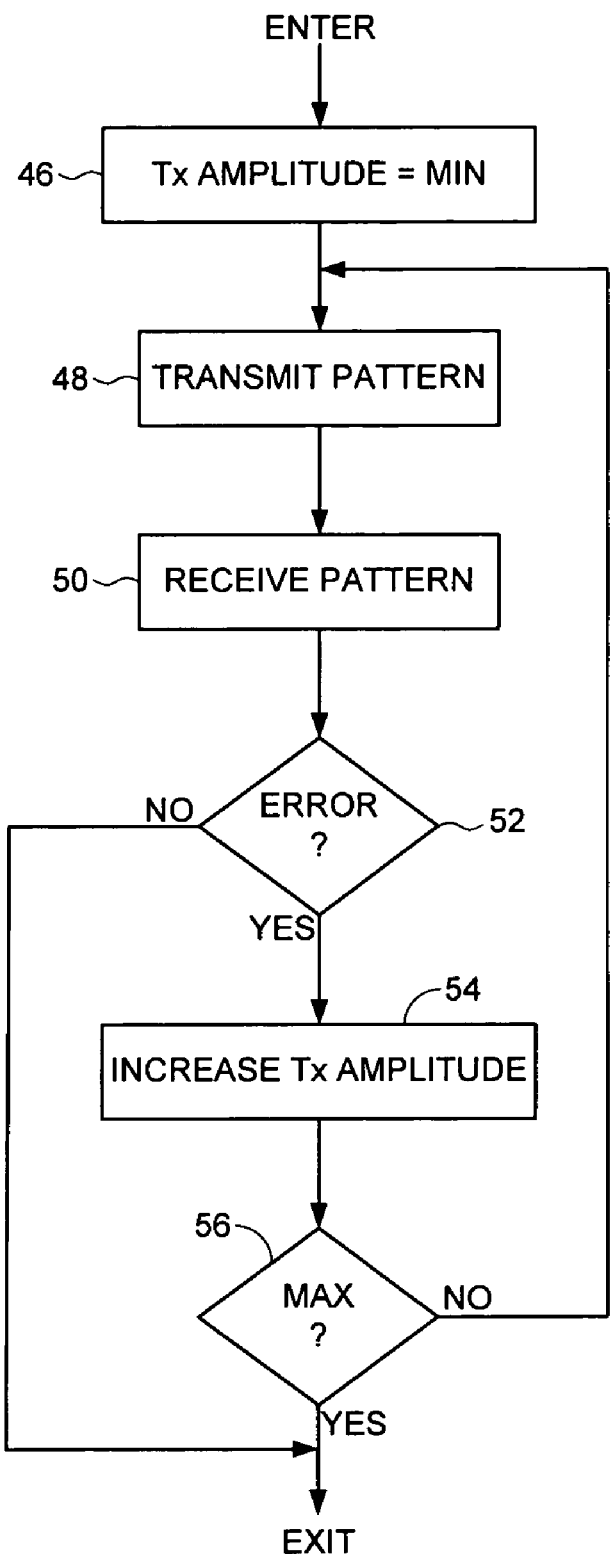
FIG. 4 is a flow diagram illustrating an embodiment of the present invention wherein the transmission amplitude is increased until the loopback pattern is received from the host error free.

The transmission amplitude may be adjusted in any suitable manner in response to errors detected in the loopback pattern during the calibration process. FIG. 4 illustrates an embodiment wherein the transmission amplitude is increased until the loopback pattern is received error free. At step 46 the transmission amplitude is initialized to a minimum value, and at step 48 the calibration pattern is transmitted to the host. At step 50 the loopback pattern is received from the host, and at step 52 the loopback pattern is processed to detect an error. If an error is detected, the transmission amplitude is increased at step 54, and if at step 56 the transmission amplitude has not reached a maximum, then the flow diagram of FIG. 4 is re-executed starting at step 48. In this manner the transmission amplitude is increased until the loopback pattern is received error free at step 52, or until the transmission amplitude reaches a maximum value.

Figure 5:
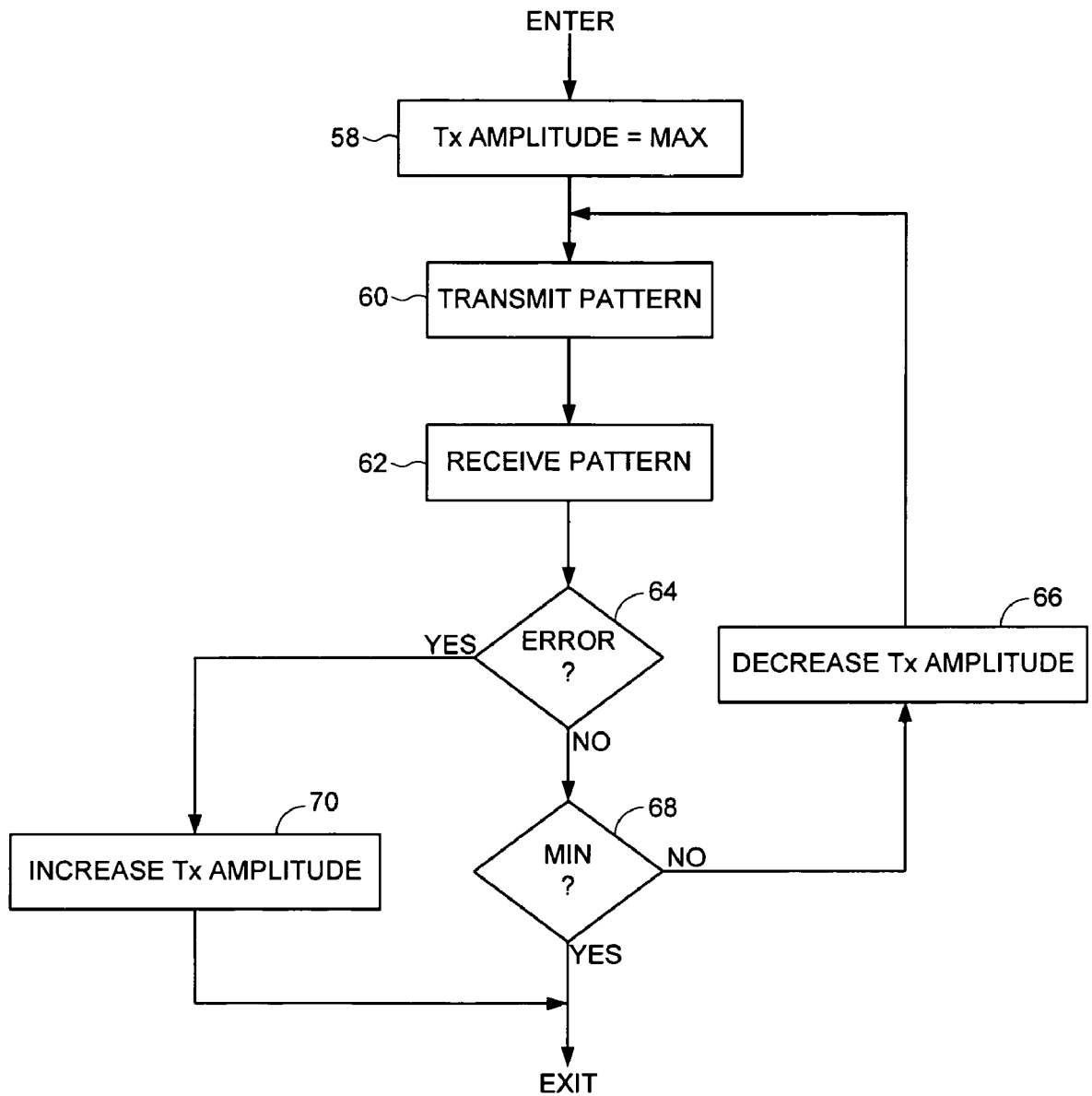
FIG. 5 is a flow diagram illustrating an embodiment of the present invention wherein the transmission amplitude is decreased until the loopback pattern is received from the host error free.

FIG. 5 shows an alternative embodiment of the present invention wherein the transmission amplitude is decreased until an error is detected in the loopback pattern. At step 58 the transmission amplitude is initialized to a maximum value, and at step 60 the calibration pattern is transmitted to the host. At step 62 the loopback pattern is received from the host, and at step 64 the loopback pattern is processed to detect an error. If an error is not detected, the transmission amplitude is decreased at step 66, and the flow diagram of FIG. 5 is re-executed starting at step 60. This process is repeated until the transmission amplitude reaches a minimum at step 68. In this manner, the transmission amplitude is decreased until an error is detected in the loopback pattern at step 64, or until the transmission amplitude reaches a minimum value. If an error is detected in the loopback pattern at step 64, then at step 70 the transmission amplitude is increased to revert the transmission amplitude to where the loopback pattern was received error free. This embodiment optimizes power consumption by transmitting at the lowest reliable transmission amplitude.

Figure 6:
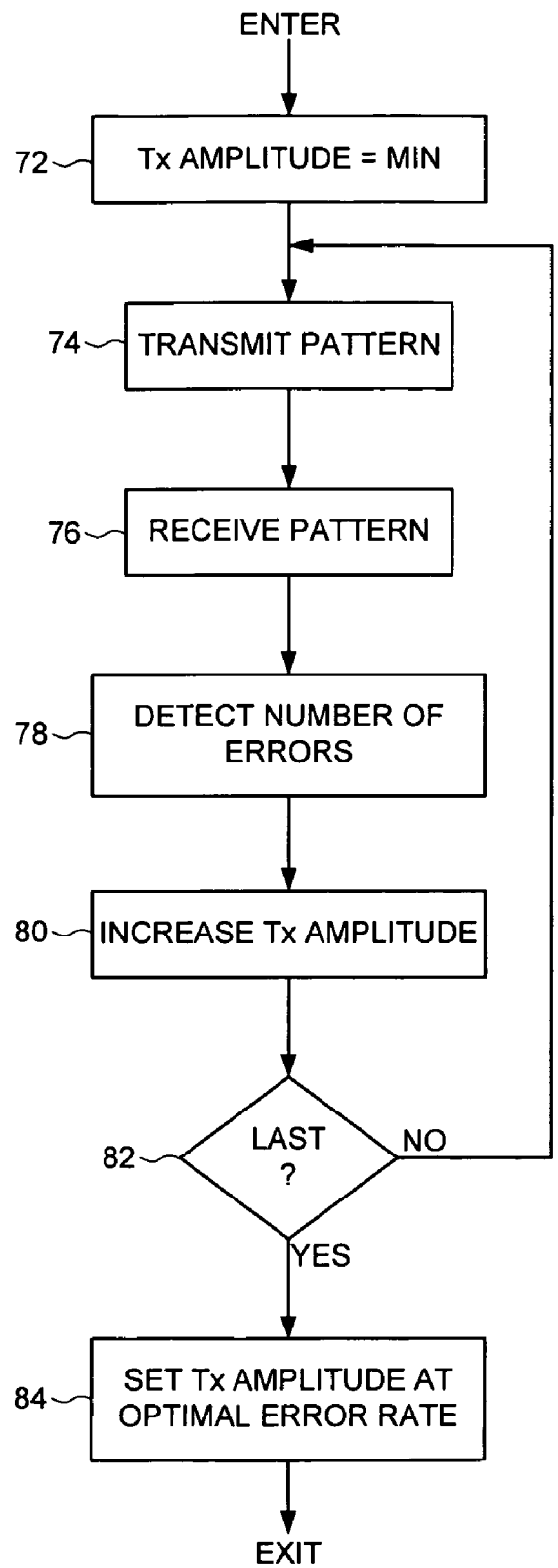
FIG. 6 is a flow diagram illustrating an embodiment of the present invention wherein the transmission amplitude is set to a plurality of different values, a plurality of corresponding error values are detected, and an operating transmission amplitude is selected in response to the plurality of error values.

FIG. 6 shows yet another embodiment of the present invention wherein the transmission amplitude is set to a plurality of different values and a plurality of corresponding error values are detected. An operating transmission amplitude is then selected in response to the plurality of error values. At step 72 the transmission amplitude is initialized to a minimum value, and at step 74 the calibration pattern is transmitted to the host. At step 76 the loopback pattern is received from the host, and at step 78 the loopback pattern is processed to detect an error. At step 80 the transmission amplitude is increased and the flow diagram of FIG. 6 re-executed starting at step 74 until at step 82 the last transmission amplitude value has been tested. At step 84 the operating transmission amplitude is selected in response to the plurality of error values detected at step 78. In one embodiment, the operating transmission amplitude is selected so as to minimize the number of errors detected in the loopback pattern, and in an alternative embodiment, the operating transmission amplitude is selected so that the number of errors detected in the loopback pattern falls below a predetermined threshold. Thus, in this alternative embodiment, one might tolerate a higher number of errors in order to maintain greater power savings.

Figure 7:
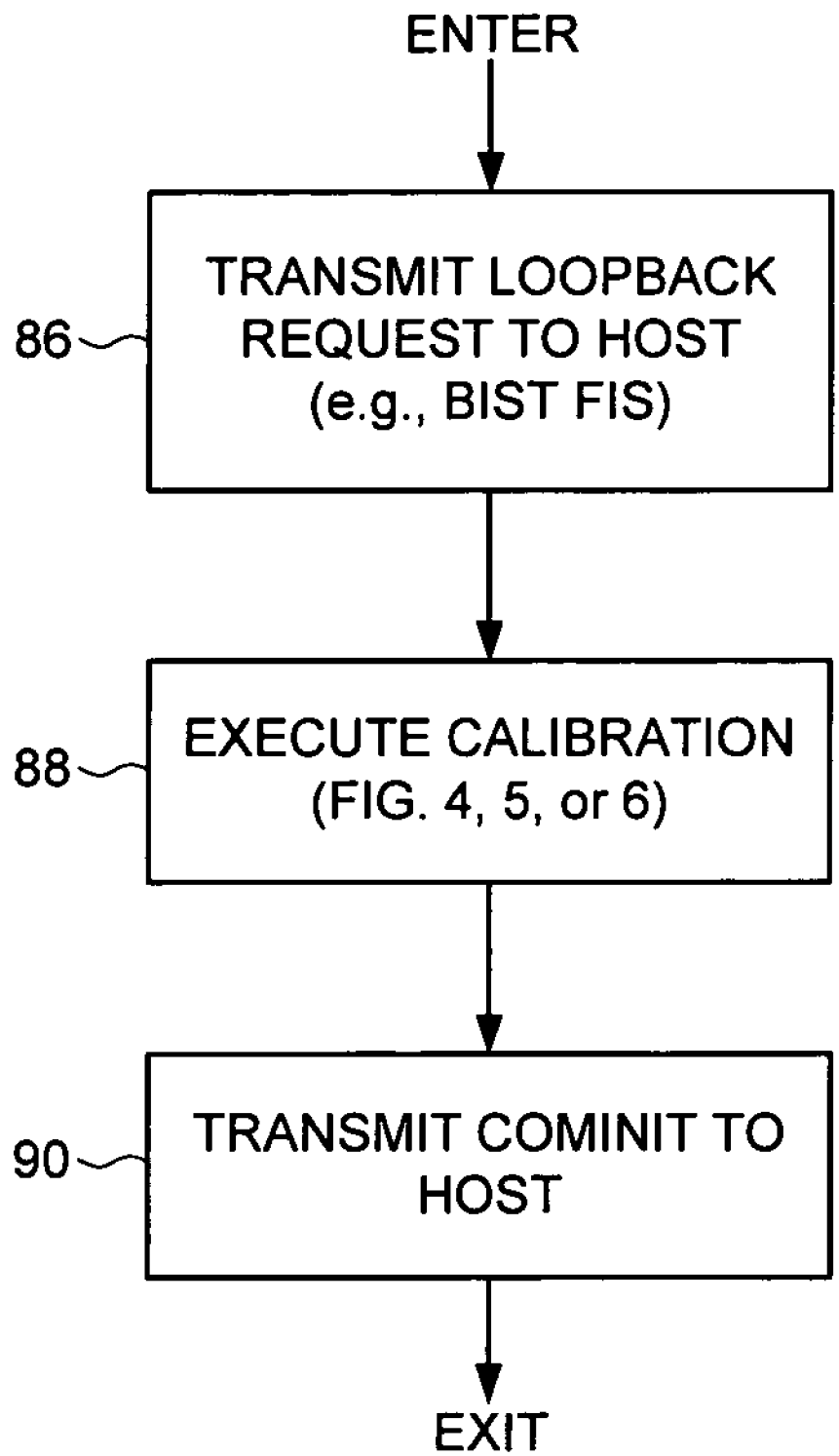
FIG. 7 shows an embodiment of the present invention wherein a request (e.g., a BIST FIS) is transmitted to the host to enable the loopback circuitry.

FIG. 7 illustrates an embodiment of the present invention wherein at step 86 the control circuitry 26 of the disk drive 12 transmits a request to the host 14 to enable the loopback circuitry 16. For example, in the embodiment wherein the disk drive 12 is a SATA disk drive, the control circuitry 26 transmits a frame information structure (FIS) to the host, including a built-in self test (BIST) FIS to enable the loopback circuitry 16. At step 88 the transmission amplitude is calibrated (e.g., by executing the flow diagram of FIG. 4, 5, or 6), and at step 90 the control circuitry 26 transmits a COMINIT signal to the host in order to exit the BIST sequence and resume normal operation.

When calibrating the transmission amplitude, any suitable technique may be employed to detect an error in the loopback pattern 36 received from the host 14. In an embodiment illustrated in FIG. 8A, an error is detected by comparing the loopback pattern 36 to the calibration pattern 32 using comparator 92. In an alternative embodiment shown in FIG. 8B, the pattern generator 42 (FIG. 2A) comprises an encoder 94 for encoding an input pattern using any suitable code (e.g., a run-length limited code) to generate the calibration pattern 32 transmitted to the host. The error detector 44 (FIG. 2A) comprises a suitable decoder 96 for decoding the loopback pattern 36 received from the host 14, wherein an error is detected if the decoder 96 detects invalid data in the loopback pattern 36.

I claim:

1. A disk drive for connecting to a host, the host comprising loopback circuitry operable to loop a pattern received from the disk drive back to the disk drive, the disk drive comprising:
    (a) a disk;
    (b) a head actuated over the disk;
    (c) interface circuitry for interfacing with the host, the interface circuitry comprising:
        a transmitter driver operable to transmit transmission signals at a transmission amplitude; and
        a receiver driver operable to receive reception signals; and
    (d) control circuitry operable to calibrate the transmission amplitude by:
        configuring the transmitter driver to transmit at an initial transmission amplitude;
        transmitting a calibration pattern to the host through the transmitter driver;
        monitoring the reception signals received by the receiver driver to detect a loopback pattern representing a loopback of the calibration pattern;
        processing the loopback pattern to detect an error; and
        adjusting the transmission amplitude in response to the error.

2. The disk drive as recited in claim 1, wherein the interface circuitry comprises a serial communication interface.

3. The disk drive as recited in claim 2, wherein the interface circuitry comprises a serial advanced technology attachment (SATA) interface.

4. The disk drive as recited in claim 2, wherein:
    (a) the disk drive is operable to receive an out-of-band signal from the host; and
    (b) the control circuitry is operable to calibrate the transmission amplitude in response to the disk drive receiving the out-of-band signal from the host.

5. The disk drive as recited in claim 4, wherein the out-of-band signal comprises a COMWAKE signal.

6. The disk drive as recited in claim 1, wherein the control circuitry is operable to adjust the transmission amplitude by increasing the transmission amplitude.

7. The disk drive as recited in claim 1, wherein the control circuitry is operable to adjust the transmission amplitude by decreasing the transmission amplitude.

8. The disk drive as recited in claim 1, wherein the control circuitry is operable to adjust the transmission amplitude until the error reaches a predetermined threshold.

9. The disk drive as recited in claim 1, wherein the control circuitry is further operable to:
set the transmission amplitude to a plurality of different values and detect a plurality of corresponding error values; and
select an operating transmission amplitude in response to the plurality of error values.

10. The disk drive as recited in claim 1, wherein the control circuitry is further operable to transmit a request to the host to enable the loopback circuitry.

11. The disk drive as recited in claim 10, wherein the control circuitry is further operable to transmit a built-in self test frame information structure (FIS) to the host to enable the loopback circuitry.

12. The disk drive as recited in claim 1, wherein the control circuitry is operable to detect the error by comparing the loopback pattern to the calibration pattern.

13. The disk drive as recited in claim 1, wherein the control circuitry is operable to detect the error by encoding the calibration pattern and detecting invalid data in the loopback pattern.

14. A method of calibrating a transmission amplitude of transmission signals generated by a disk drive connected to a host, the host comprising loopback circuitry operable to loop a pattern received from the disk drive back to the disk drive, the method comprising the steps of:
transmitting a calibration pattern to the host at an initial transmission amplitude;
detecting a loopback pattern representing a loopback of the calibration pattern;
processing the loopback pattern to detect an error; and
adjusting the transmission amplitude in response to the error.

15. The method as recited in claim 14, wherein the disk drive is a serial attached disk drive.

16. The method as recited in claim 15, wherein the disk drive is a serial advanced technology attachment (SATA) disk drive.

17. The method as recited in claim 14, wherein the method is performed during a calibration interval of a communication reset procedure.

18. The method as recited in claim 17, wherein:
the disk drive is operable to receive an out-of-band signal from the host; and
the calibration interval occurs in response to the disk drive receiving the out-of-band signal from the host.

19. The method as recited in claim 18, wherein the out-of-band signal comprises a COMWAKE signal.

20. The method as recited in claim 14, wherein the step of adjusting the transmission amplitude comprises the step of increasing the transmission amplitude.

21. The method as recited in claim 14, wherein the step of adjusting the transmission amplitude comprises the step of decreasing the transmission amplitude.

22. The method as recited in claim 14, wherein the step of adjusting the transmission amplitude comprises the step of adjusting the transmission amplitude until the error reaches a predetermined threshold.

23. The method as recited in claim 14, further comprising the steps of:
setting the transmission amplitude to a plurality of different values;
detecting a plurality of corresponding error values; and
selecting an operating transmission amplitude in response to the plurality of error values.

24. The method as recited in claim 14, further comprising the step of transmitting a request to the host to enable the loopback circuitry.

25. The method as recited in claim 24, wherein the step of transmitting the request to the host to enable the loopback circuitry comprises the step of transmitting a built-in self test frame information structure (FIS) to the host.

26. The method as recited in claim 14, wherein the step of processing the loopback pattern to detect the error comprises the step of comparing the loopback pattern to the calibration pattern.

27. The method as recited in claim 14, wherein the step of processing the loopback pattern to detect the error comprises the steps of encoding the calibration pattern and detecting invalid data in the loopback pattern.

* * * * *